US008261799B2

(12) United States Patent
Roth et al.

(10) Patent No.: US 8,261,799 B2

(45) Date of Patent: Sep. 11, 2012

(54) LINERLESS LABEL PRINTER

(75) Inventors: Joseph D. Roth, Springboro, OH (US); Jason Lee Lence, Morristown, TN (US); Robert Joseph Miles, Morristown, TN (US); Jerry M. Welch, Bean Station, TN (US); David M. Dashiell, Springboro, OH (US)

(73) Assignee: NCR Corporation, Duluth, GA (US)

( * ) Notice: Subject to any disclaimer, the term of this patent is extended or adjusted under 35 U.S.C. 154(b) by 223 days.

(21) Appl. No.: 12/723,398

(22) Filed: Mar. 12, 2010

(65) Prior Publication Data

US 2011/0220291 A1 Sep. 15, 2011

(51) Int. Cl.

| | |
|---|---|
| ***B29C 65/48*** | (2006.01) |
| ***B29C 63/26*** | (2006.01) |
| ***B32B 37/26*** | (2006.01) |
| ***B32B 43/00*** | (2006.01) |

(52) U.S. Cl. ......... 156/387; 156/537; 156/580; 156/767

(58) Field of Classification Search .................. 156/277, 156/289, 701, 719, 384, 387, 537, 580, 750, 156/767

See application file for complete search history.

(56) References Cited

U.S. PATENT DOCUMENTS

| | | | | |
|---|---|---|---|---|
| 6,433,808 | B1 * | 8/2002 | Kershner et al. | 347/215 |
| 6,766,997 | B2 * | 7/2004 | Stewart, III | 248/690 |
| 7,186,043 | B2 * | 3/2007 | Keller | 400/619 |

* cited by examiner

*Primary Examiner* — Sing P Chan

(74) *Attorney, Agent, or Firm* — Charles Q. Maney; Dana T. Hustins

(57) ABSTRACT

Various modifications to a printer to allow the printer to print on linerless adhesive media are described. In one embodiment, a release block is attached to the printer superior to a rubber drive roller. The release block limits the linerless adhesive media from contacting and/or remaining on the rubber drive roller when the linerless adhesive media is fed past print head. The release block may be a guide label, a piece of tape, or fixture. A guide label is adhesively attached and comprises a substrate, an adhesive layer, and release layers so that the linerless adhesive media does not stick to the guide label. Tape may be adhesively attached with a release layer attached to the tape. The fixture may be mechanically attached, magnetically attached, or adhesively attached to the printer. The release block may be removed at any time to allow for standard operation of the printer.

26 Claims, 18 Drawing Sheets

LINERLESS LABEL PRINTER

FIELD OF THE INVENTION

The present invention relates generally to print devices, such as a point-of-sale print device.

BACKGROUND

When a customer makes a purchase or return at a retail store, a receipt or credit voucher may be printed as reference of the transaction. An employee may use a point of service (POS) terminal to enter a transaction and a printer operatively connected to the POS terminal may print the receipt or credit voucher. As wider applications of printing become more popular, it becomes important to be able to use existing printers for multiple uses.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques and tools are provided for reversibly transforming a printer to print linerless adhesive media.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods and techniques are described to transform a printer, for example a POS printer, to be able to print linerless adhesive media. As used herein, linerless adhesive media may refer to pressure-sensitive labels that do not have a liner (e.g., a silicone coated substrate) that is removably attached to the adhesive side of the labels. Linerless adhesive media may be used in many areas including, but not limited to, logistics, labeling, and pricing, as well as for making self-adhesive receipt or credit vouchers.

Linerless adhesive media presents a lower cost by reducing materials, packaging, shipping, and waste removal vis-à-vis standard lined rolls of labels. However, linerless adhesive media may attach to various surfaces in a printer including, but not limited to, a platen (e.g., rubber) roller as the media is fed through the printer causing jams. Adhesive material from the linerless adhesive media may also build up on various surfaces (including the platen) over time leading to jams and/or “morning sickness” where built-up adhesive material may set-up over periods of non-use (e.g., night) presenting a jam for the next subsequent (e.g., morning) print.

Figure 1A:
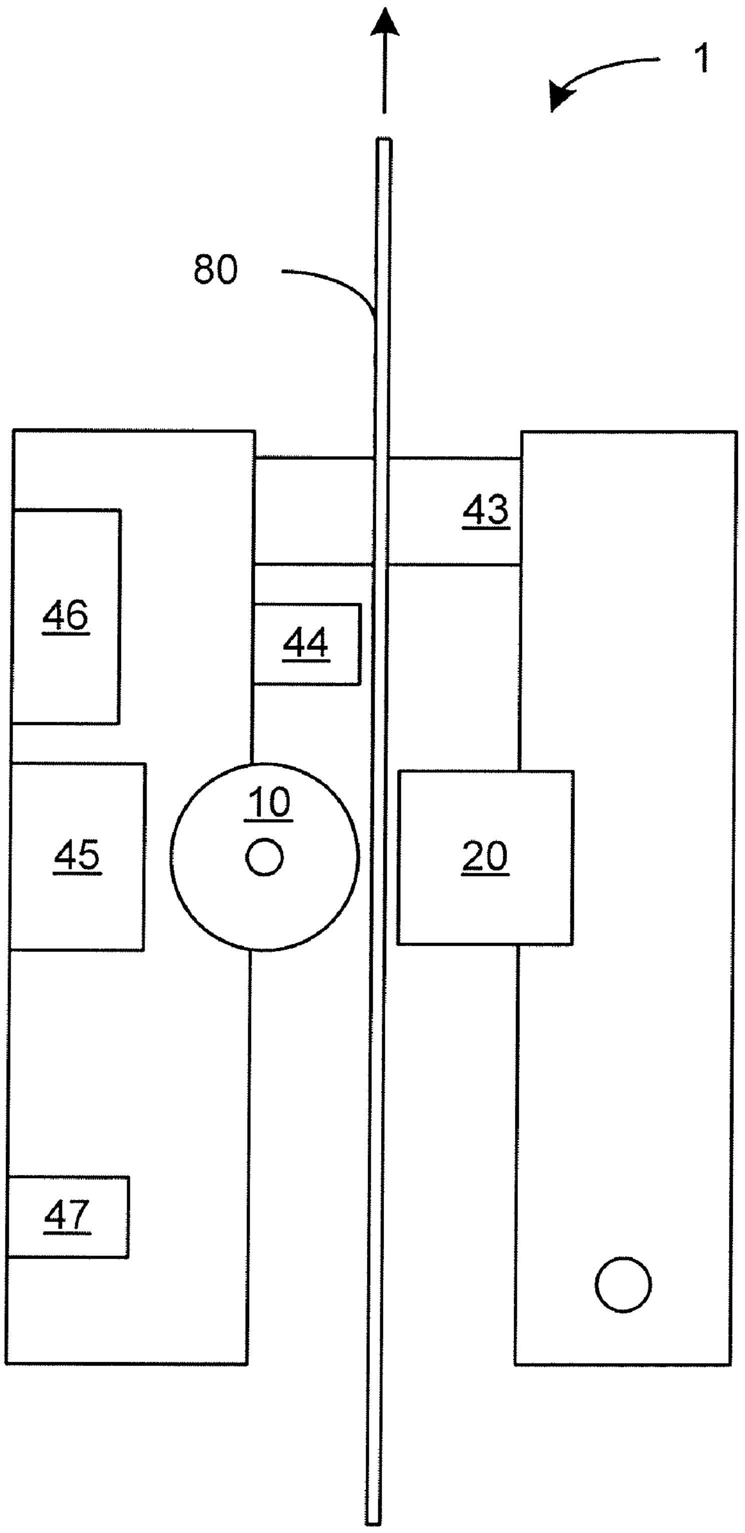
FIG. 1A is an illustration of components of a printer.

A printer operatively connected to a POS terminal may print via direct thermal printing, whereby a print head selectively applies heat to paper or other sheet media comprising a substrate with a thermally sensitive coating. The coating changes color when heat is applied, by which “printing” is provided on the coated substrate. A printer may also print via dot matrix, laser, or inkjet. However, any type of printer may be used. Key components of a standard POS printer are illustrated in FIGS. 1A and B. Note that in each of the figures (including FIGS. 1A and B), like numbers may represent the same structure across multiple different figures.

As shown in FIG. 1A, a printer 1 may comprise, among other things, a platen 10, also referred to herein as a rolling platen. The rolling platen 10 may comprise one or more compressive and/or friction enhancing materials (e.g., rubber). The rolling platen 10 is located opposite a print head 20 (e.g., thermal, ink jet, dot matrix, and the like) that performs the printing on media.

As further shown in FIG. 1A, the printer 1 may further include a cutting mechanism 43, such as a knife/blade, a slitter, a tear bar or strip, and the like. The cutting mechanism 43 may be used to produce a custom cut of installed media 80 (e.g., non-adhesively coated receipt or credit voucher, and/or linerless label, material), which media may be provided in sheet and/or roll form.

As shown in FIG. 1A, a printer 1 may further include a motor and/or drive assembly 45 for transporting media through the printer 1 (such as, for example, via driving rotation of the rolling platen 10), a controller 46 (including, for example, a processor, and static/permanent and/or volatile memory) for controlling operation of the printer 1 (such as, for example, signaling a drive assembly 45 to transport media 80 through the printer 1; providing a signal to a print head 20 to print particular information on the media; and/or signaling a cutter 43 to cut the media at a location, which cut may be based on a signal provided by a sensor 44 in sensing presence, absence, distribution, and the like of adhesive and/or one or more sensemarks), and a communication module 47 for receiving print information (e.g., transaction data) and/or commands (e.g., print and/or knife cut commands) from an associated host computer or terminal (e.g., POS terminal) (not shown) and/or providing the same to the controller 46.

It should be noted that the structure of the printer 1 of FIG. 1A is for illustration purposes only. Depending on the embodiment, the absolute and/or relative location of the various components of the printer 1 illustrated in FIG. 1A may vary as desired or required.

Figure 1B:
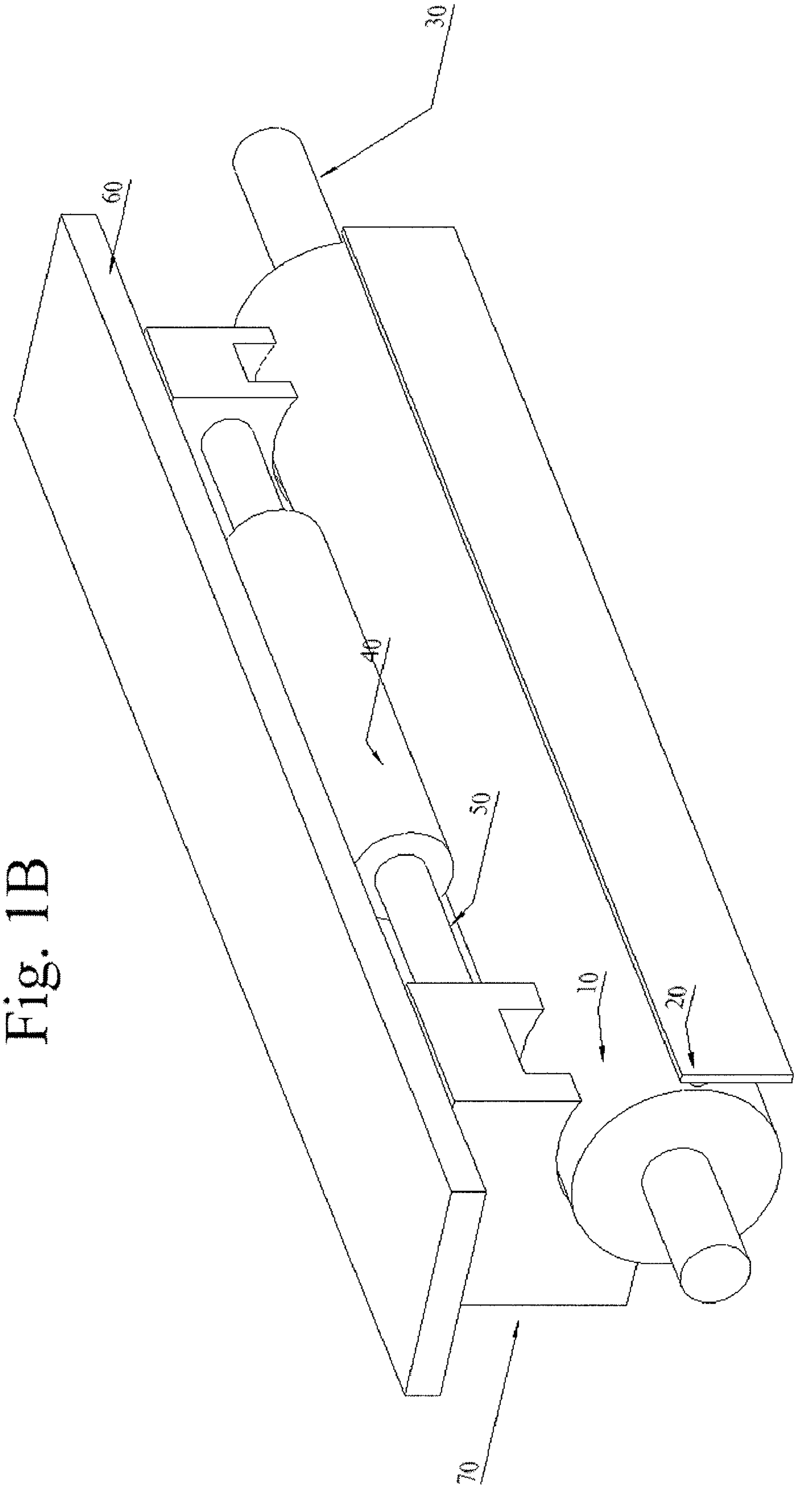
FIG. 1B is an illustration of various components of a printer.

FIG. 1B shows a detailed view of various components of a printer such as the printer 1 of FIG. 1A. As shown in FIG. 1B, the rolling platen 10 is attached to the printer by a shaft (e.g. a metal shaft) 30 or axle. A gear head may be placed on either or both ends of the metal shaft 30 that mechanically drives the rolling platen 10 (e.g., via a motor and/or drive assembly 45) to feed the media through the printer. A hard (e.g., plastic) roller 40 is located adjacent and superior to the rolling platen 10 and is attached to the printer via a shaft (e.g., metal shaft) or axle 50. A plate (e.g., metal) 60 is located superior to the hard roller 40. Mounts 70 comprising plastic, composite, or any other suitable material hold the metal shaft 50 of the hard roller 40 in place.

Figure 2:
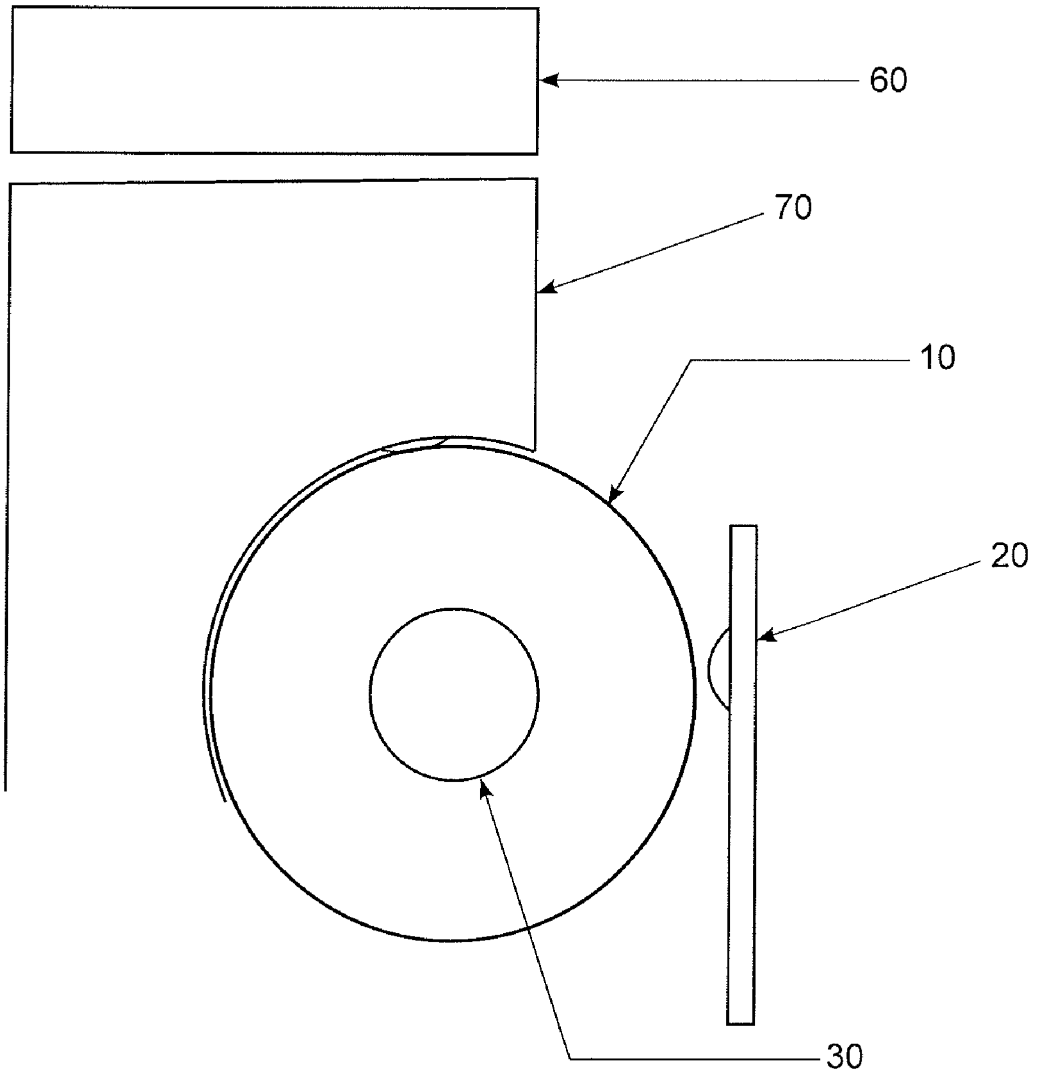
FIG. 2 is an illustration of components of a printer from a side angle.

FIG. 2 represents the same structure as FIG. 1B but is presented at a side angle. As described earlier, the rolling platen 10 is located opposite the print head 20 that performs the printing on media. The rolling platen 10 is attached to the printer by metal shaft or axle 30. A plate 60 is located superior to the hard roller 40. Mounts 70 hold the metal shaft 50 of the hard roller 40 in place and obscures the viewing of the hard roller 40 in the illustration.

Figure 3:
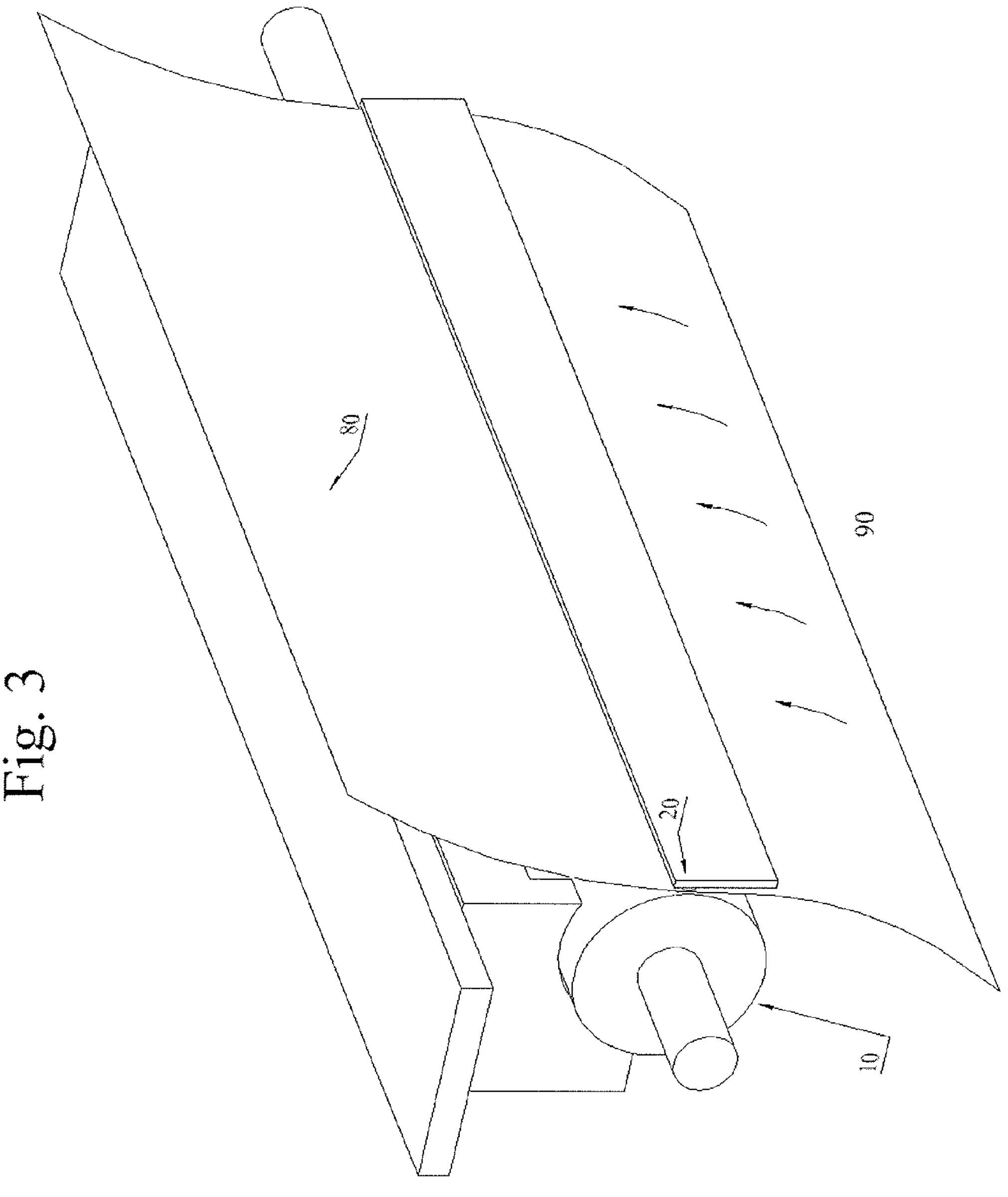
FIG. 3 is an illustration of components of a printer with media showing feed direction of the media.

FIG. 3 represents the same structure as FIG. 1B but with the addition of media 80 (e.g., paper such as direct thermal paper). The media 80 is fed past the rolling platen 10 and print head 20 where the media 80 is printed in feed direction 90.

Figure 4:
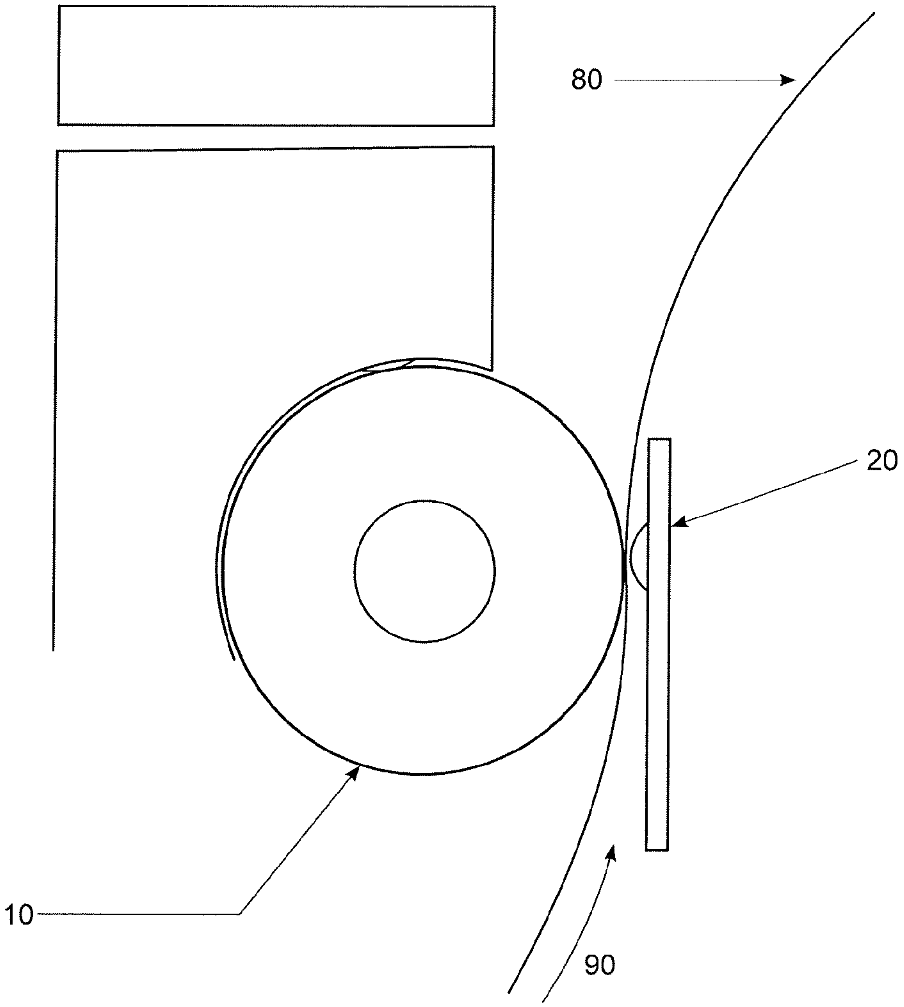
FIG. 4 is an illustration of components of a printer with media showing feed direction of the media from a side angle.

FIG. 4 represents the same structure as FIG. 3 but at a side angle. The media 80 is fed past the rolling platen (e.g., rubber roller) 10 and print head 20 where the media 80 is printed as it moves along feed direction 90.

In an embodiment, a printer is modified to print on linerless adhesive media by adding a release block. The release block limits the linerless adhesive media from contact with and/or remaining on the rolling platen (e.g., rubber drive roller) when the linerless adhesive media is fed past the print head. The release block may be a guide label, a piece of tape, or fixture. A guide label is adhesively attached and comprises a plurality of layers. Layers may comprise a substrate layer, an adhesive layer, and a release layer so that the linerless adhesive media does not stick to the guide label. Tape may be adhesively attached to the printer with a release layer attached to the tape. The fixture may be attached to the printer mechanically, magnetically, or adhesively.

The release block may be removed at any time to allow for standard operation of the printer and returning the printer to its prior state. The ability to remove the release block also makes it easy and cost effective to replace the release block when worn or damaged. Various embodiments of the release block with the printer are described by way of the drawings.

Release Block as a Guide Label

Figure 5:
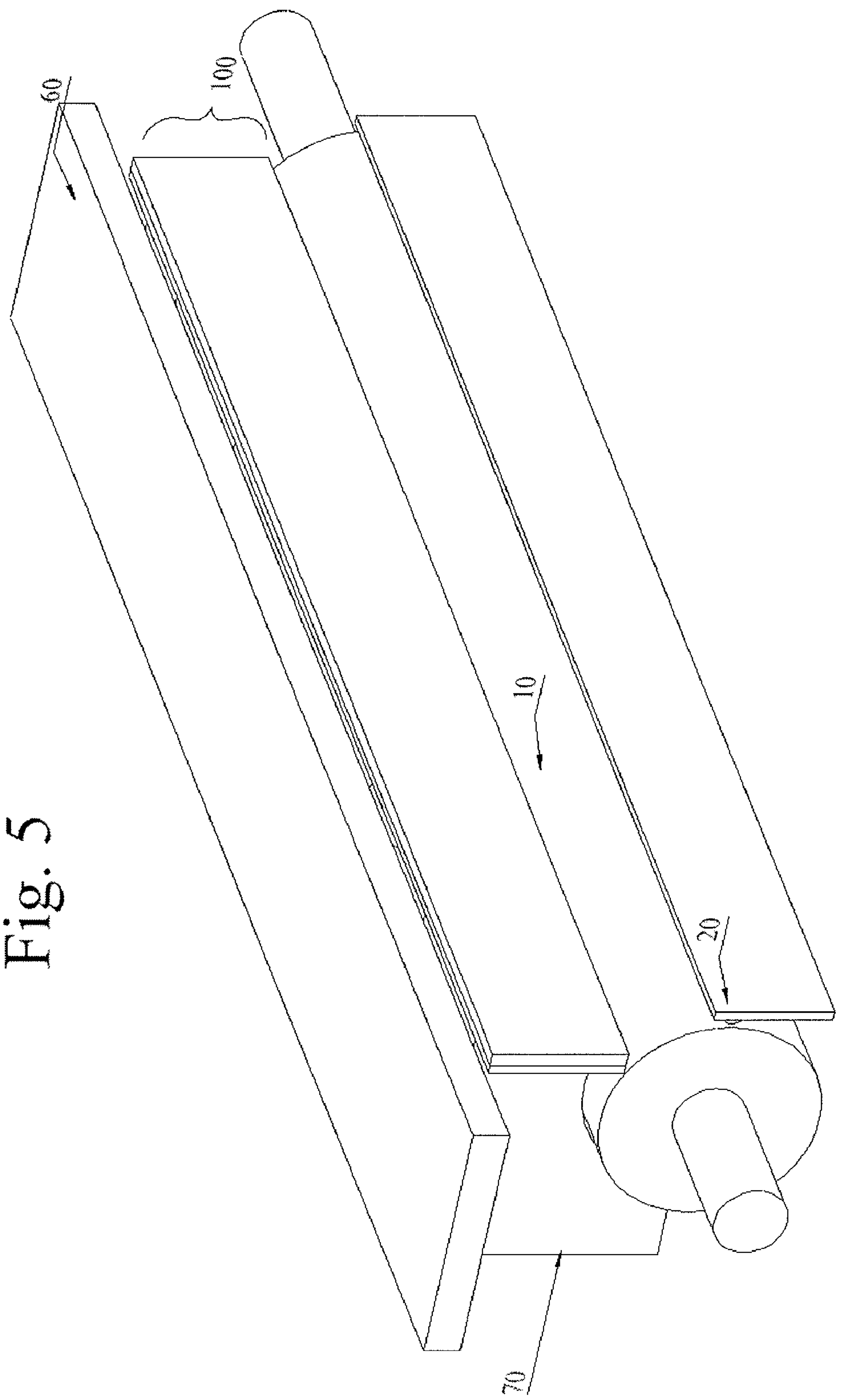
FIG. 5 is an illustration of components of a printer with a guide label attached comprising two layers, according to an embodiment of the invention.

In an embodiment, a guide label is adhesively attached to the printer in order to minimize linerless adhesive media from sticking to the rolling platen when printed. FIG. 5 illustrates where the guide label is adhesively attached. In FIG. 5, the guide label 100 is attached superior to the rolling platen 10 but below the plate 60. The guide label 100 is attached to the mounts 70 and covers up the hard roller 40. The guide label, as illustrated, has a thickness that is exaggerated.

Figure 6:
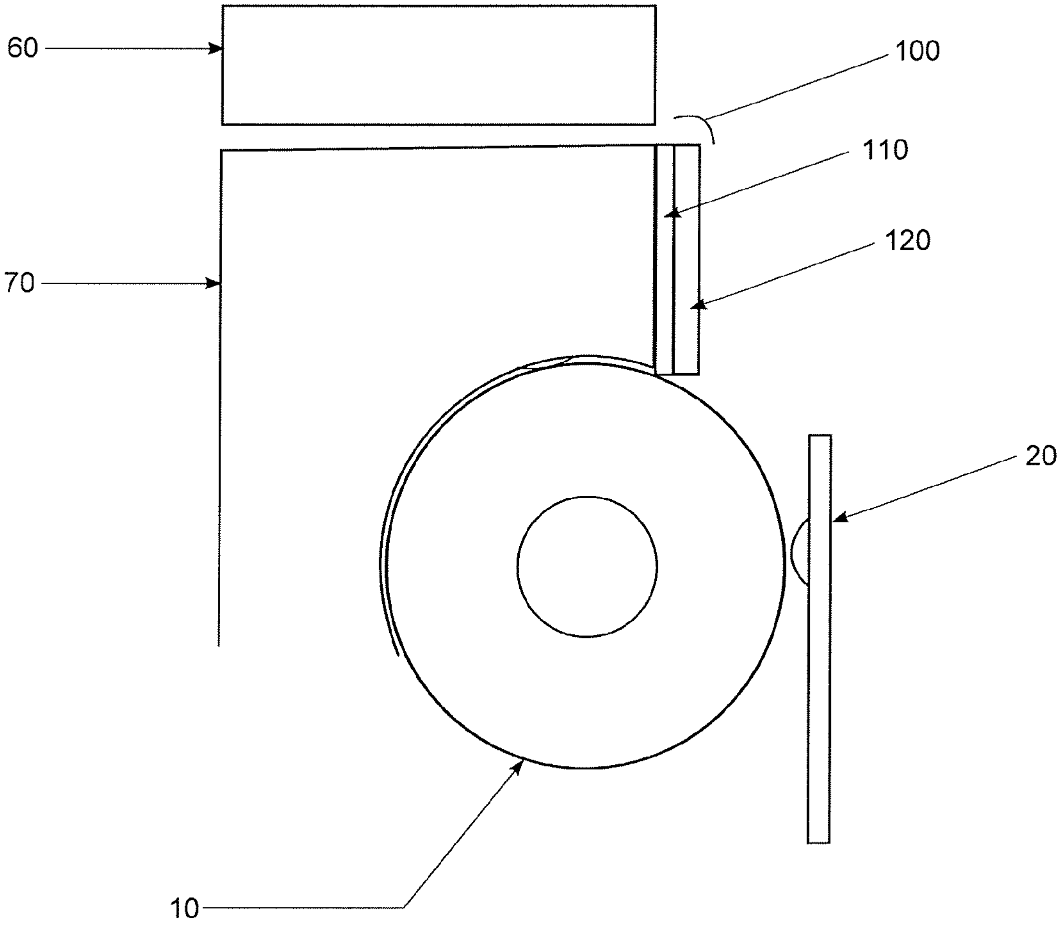
FIG. 6 is an illustration of components of a printer with a guide label attached comprising two layers from a side angle, according to an embodiment of the invention.

In an embodiment, the guide label may comprise two layers. This is illustrated in FIG. 6. FIG. 6 is a side view of the same illustration in FIG. 5. The guide label 100 is attached to the mount 70 located superior to the rolling platen 10 and below the plate 60. The print head is opposite the rolling platen 10. Guide label 100 comprises the adhesive layer 110 and the substrate layer 120.

In an embodiment, the substrate layer 120 may comprise any one of plastic, paper, or composite materials. In an embodiment, the substrate layer 120 comprising plastic may be coated or uncoated. Coating on the plastic may include, but is not limited to polytetrafluoroethylene (PTFE) or any other type of polymer that has good release characteristics, or polyester that is stiff and not known for release characteristics. In an embodiment, the substrate layer 120 comprising paper may also be coated or uncoated. Coatings for paper may include those described with plastic such as PTFE or polyester, but may include any other type of coatings that help minimize the linerless adhesive media from attaching to the guide label. In an embodiment, the substrate layer 120 may also comprise composite materials. Composite materials may include, but is not limited to, combinations of plastic and paper, combinations of different plastics, or any combinations of materials that may be used that minimizes the linerless adhesive media from attaching to the guide label.

In an embodiment, the adhesive layer 110 of the guide label may vary widely based on the properties of the adhesive. For example, adhesive might be used that is easily removable in order to facilitate changing or removing the guide label. In another example, the adhesive might be nearly permanent as the POS printer might be intended to be always used to print linerless adhesive media. In yet another example, various degrees of stickiness between removable and permanent may be used based upon the individual implementation and intended use of the POS printer.

In an embodiment, the release block is tape. In an embodiment, the tape is two sided tape with one side of the tape adhesively attached to the printer and the opposite side of the tape attached to a release liner. FIG. 6 may also be used to illustrate this embodiment, as tape is represented by the adhesive layer 110 and the release liner attached to the tape is represented by the substrate layer 120.

Figure 7:
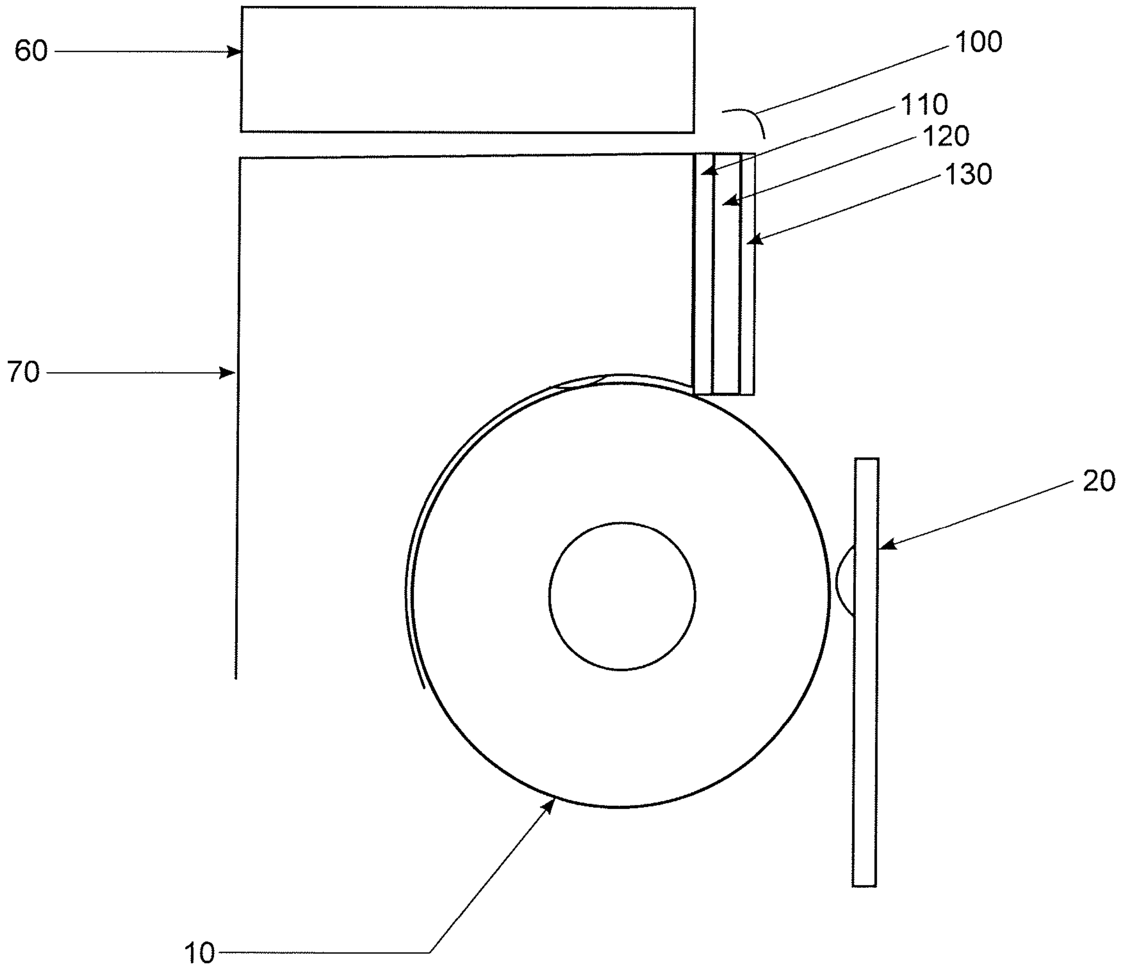
FIG. 7 is an illustration of components of a printer with a guide label attached comprising three layers from a side angle, according to an embodiment of the invention.

In an embodiment, the guide label comprises three layers, an adhesive layer, a substrate layer, and a release layer. This is illustrated in FIG. 7. The guide label is attached to the mount 70 located superior to the rolling platen 10 and below plate 60. The print head 20 is opposite the rolling platen 10. Guide label 100 comprises the adhesive layer 110, the substrate layer 120, and the release layer 130.

In an embodiment, the release layer 130 comprises any material that does not form strong bonds with the adhesive used in the linerless adhesive media. Examples of such materials are, but not limited to, silicone, fluoropolymers, PTFE, and waxes. In other embodiments, rather than a separate release layer, release characteristics are included in the materials used in the substrate layer. For example, a substrate layer of PTFE would present strong release characteristics and negate the need for an additional release layer.

Figure 8:
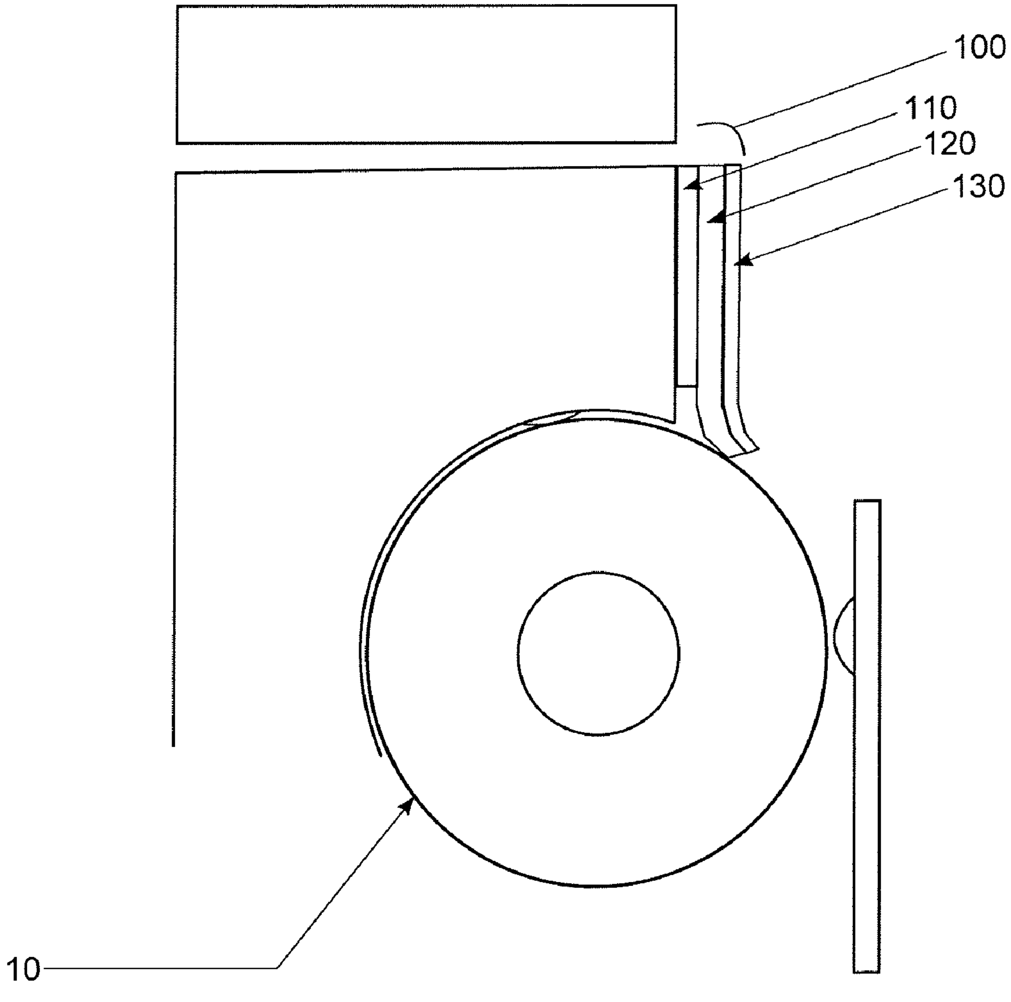
FIG. 8 is an illustration of components of a printer with a guide label attached comprising three layers with adhesive not covering the entire backside of the label, according to an embodiment of the invention.

Variations of the guide label may also be implemented. In an embodiment, the adhesive layer does not cover the entire backside of the guide label 100. This is shown in FIG. 8 as the adhesive layer 110 stops and does not extend all of the way to the rolling platen 10. The substrate layer 120 and the release layer 130 do extend much further down than the adhesive layer 110.

Figure 9:
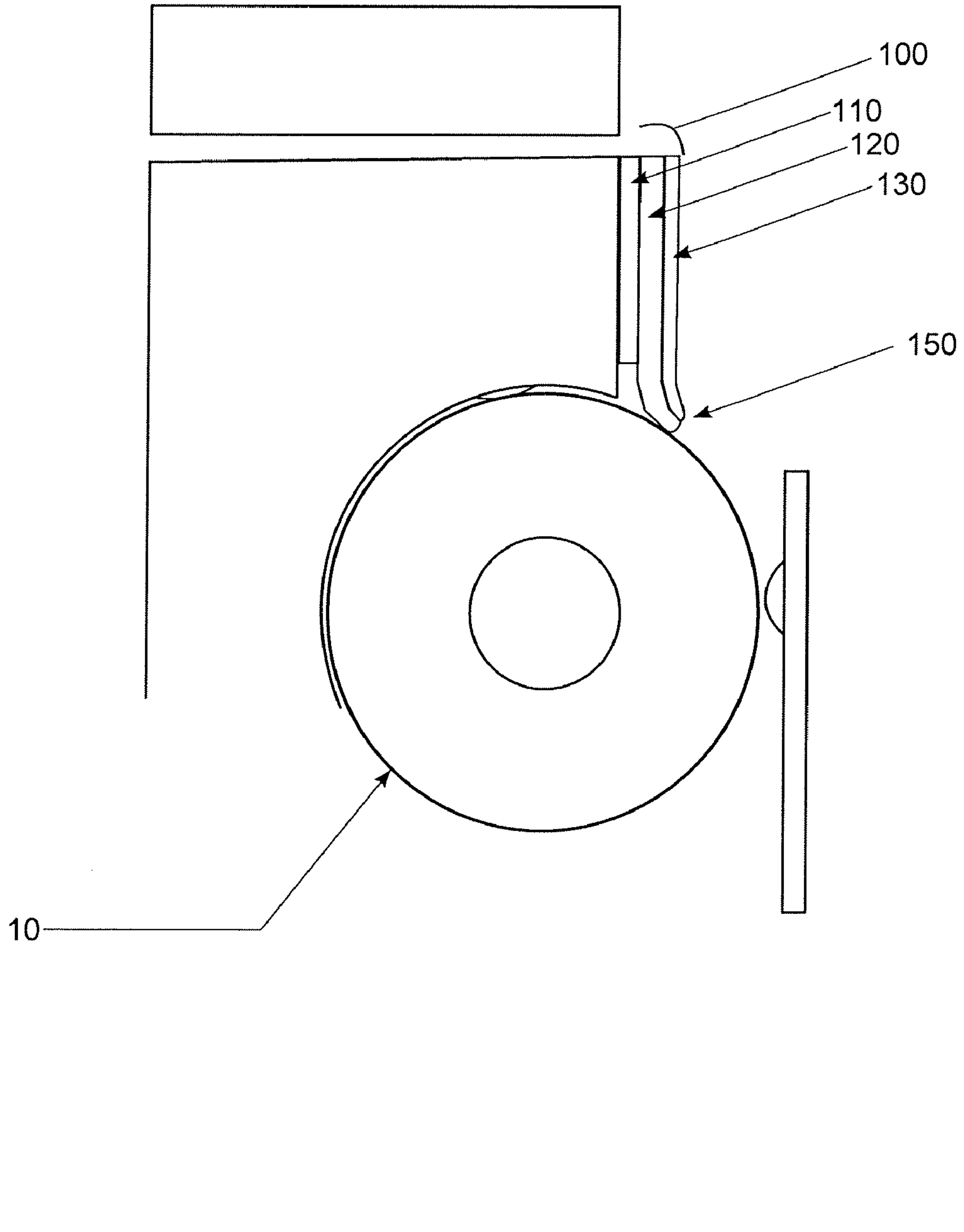
FIG. 9 is an illustration of components of a printer with a guide label attached comprising three layers with adhesive not covering the entire backside of the label and a rounded end, according to an embodiment of the invention.

Different ends of the guide label that meets the linerless adhesive media may also be implemented. In an embodiment, the edge in contact with the rolling platen is rounded. This is shown in FIG. 9 as the substrate layer 120 and the release layer 130 of the guide label 100 are shown with rounded edges 150. The layers that are in contact with the rolling platen and rounded may vary from implementation to implementation. The rounded edge minimizes the guide label from digging into the rolling platen during printing possible causing a jam or damage to the rolling platen.

Figure 10:
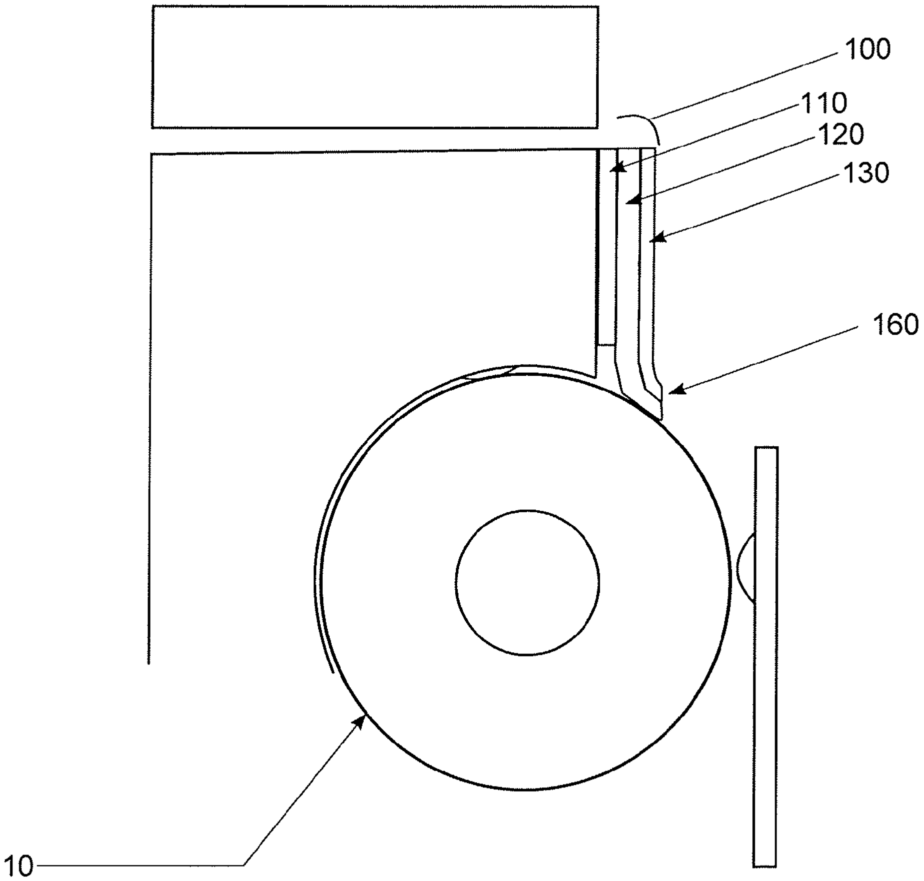
FIG. 10 is an illustration of components of a printer with a guide label attached comprising three layers with adhesive not covering the entire backside of the label and a chiseled end, according to an embodiment of the invention.

In an embodiment, the edge in contact with the rolling platen is chiseled. This is shown in FIG. 10 as the substrate layer 120 and the release layer 130 of the guide label 100 are shown with a chiseled edge 160. The layers that are in contact with the rolling platen and rounded may vary from implementation to implementation. The chiseled edge helps remove the linerless adhesive media from the rolling platen by scraping the media off of the rolling platen 10.

Figure 11:
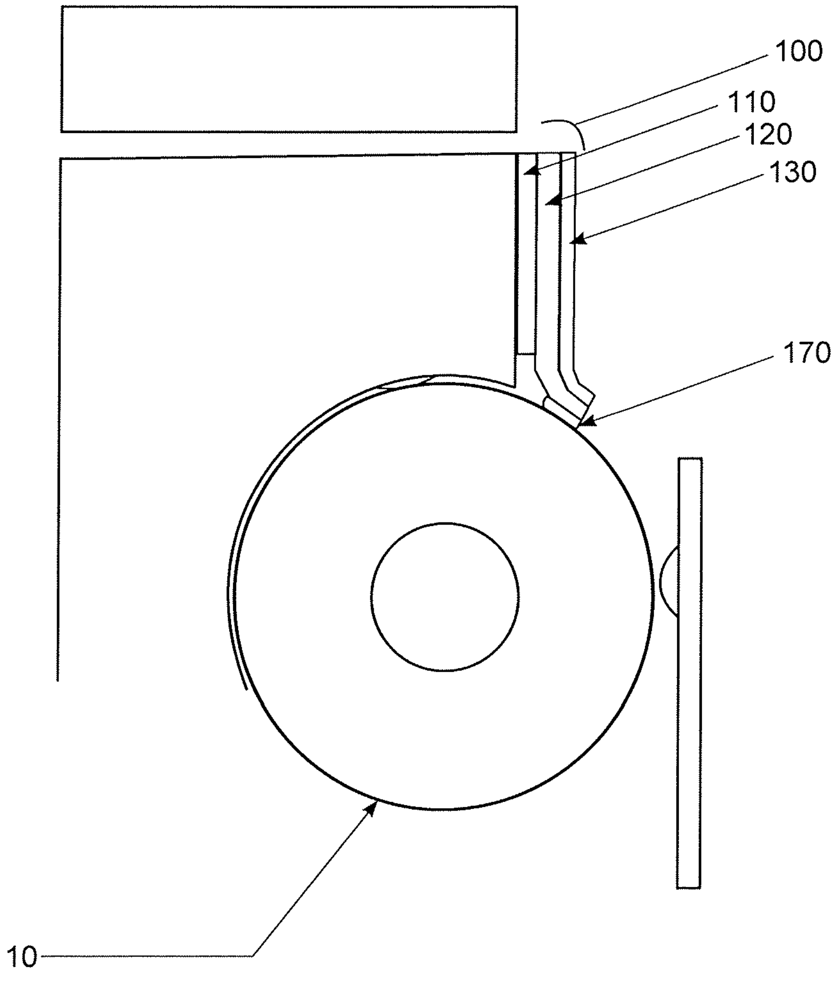
FIG. 11 is an illustration of components of a printer with a guide label attached comprising three layers with adhesive not covering the entire backside of the label and a low friction coating with the edge in contact with the rolling platen, according to an embodiment of the invention.

In an embodiment, the guide label may also comprise a layer to reduce the friction against the rolling platen. This is shown in FIG. 11. In FIG. 11, a slip layer 170 is shown that is attached to the guide label 100 where the guide label 100 is in contact with the rolling platen 10. In an embodiment, the slip layer comprises a low friction coating. This coating facilitates the rolling platen to pass smoothly under the flap of the guide label. In an embodiment, a combination of a slip layer 170 and differently formed edges may also be implemented. For example, the edge of the slip layer 170, the substrate layer 120, and the release layer 130 might be chiseled or rounded.

Figure 12:
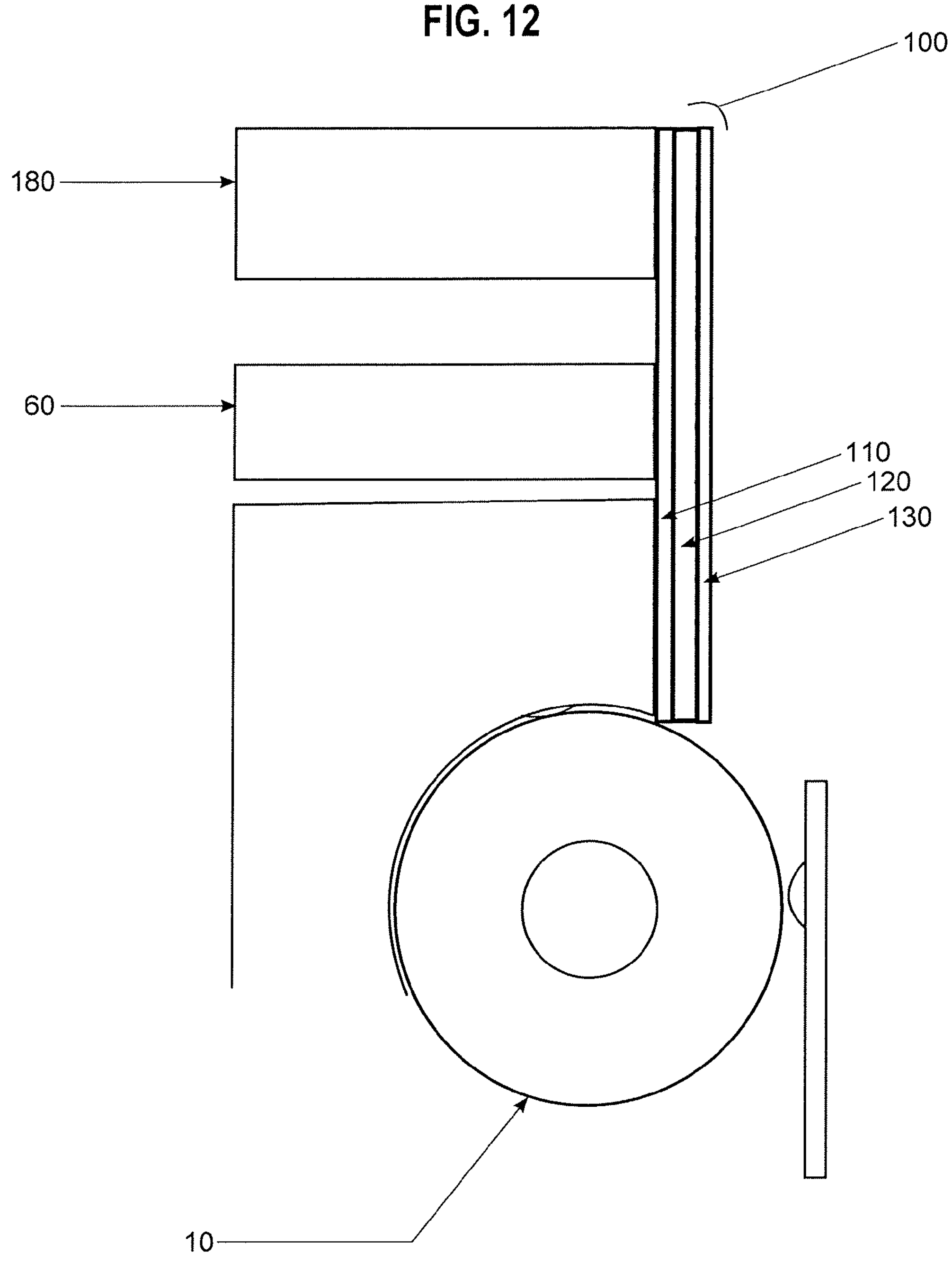
FIG. 12 is an illustration of components of a printer with an oversized guide label attached comprising three layers, according to an embodiment of the invention.

In an embodiment, the guide label may vary in size. The guide label may be smaller such that the top of the guide label only covers half of the mount. In other embodiments, the guide label may be oversized and cover the plate all the way past the cutter of the linerless adhesive media. An oversized guide label is illustrated in FIG. 12. As shown in FIG. 12, the guide label 100 extends from the rolling platen 10 and beyond the plate 60 to the cutter anvil 180 that is used to trim the linerless adhesive media to the intended size.

In other embodiments, the guide label may present more or less than three layers. The guide label is effective so long as the guide label is attached to the printer to allow the guide label to stop linerless adhesive media from remaining stuck to the rolling platen and having release characteristics so that the linerless adhesive media does not stick to the guide label itself. Combinations of different characteristics (amount of adhesive layer, shape of edges, number of layers, size, etc.) may be implemented to mix and match characteristics most advantageous for a particular implementation.

Release Block as a Fixture

Figure 13:
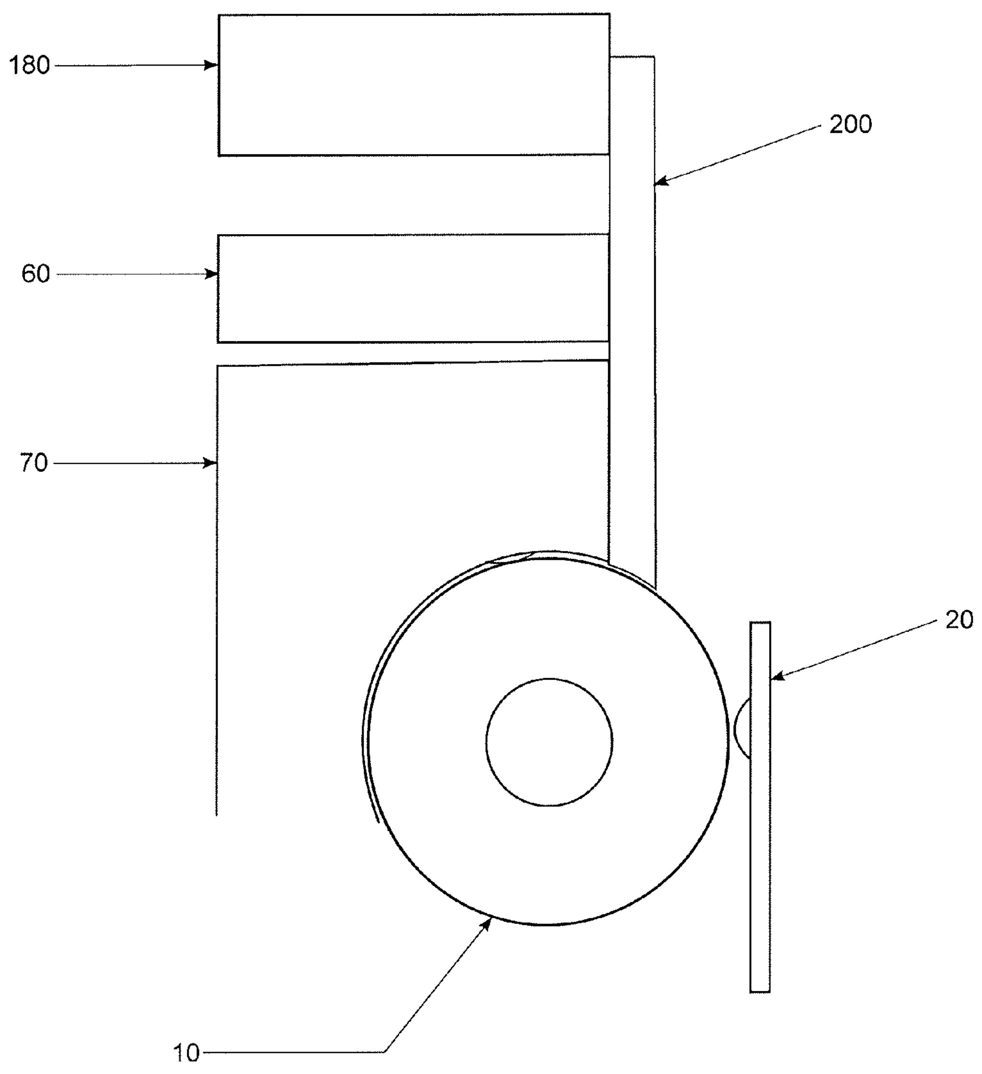
FIG. 13 is an illustration of components of a printer with a fixture attached, according to an embodiment of the invention.
Figure 14:
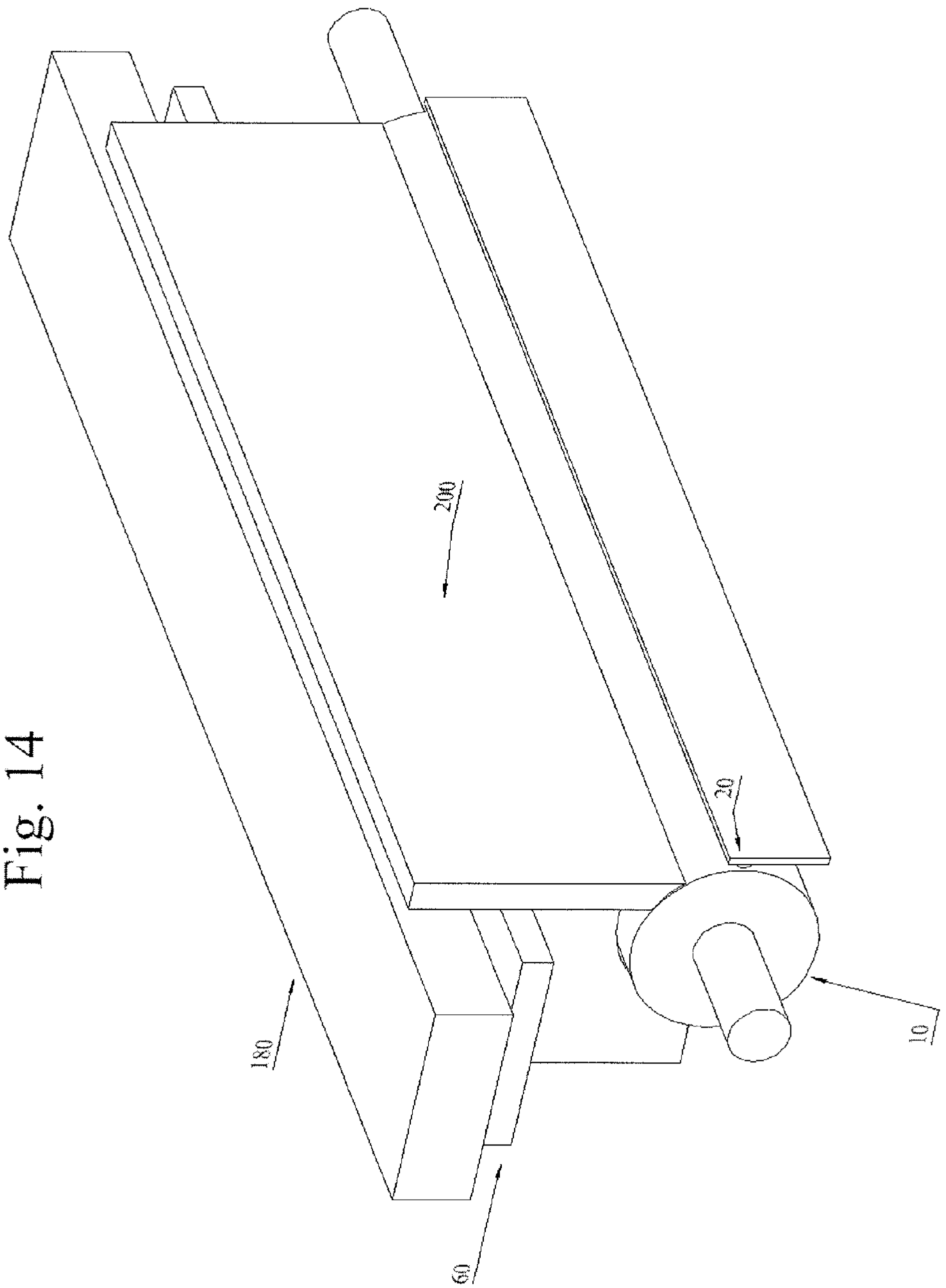
FIG. 14 is an illustration of components of a printer with a fixture attached from a different viewing angle, according to an embodiment of the invention.

In an embodiment, a fixture is attached to the POS printer in order to minimize linerless adhesive media from sticking to the rolling platen when printed. FIG. 13 illustrates where a fixture is attached to the printer. In FIG. 13, the fixture 200 is attached superior to the rolling platen 10 and print head 20 and also covers the plate 60. The fixture may be attached in a multiple of ways. In an embodiment, the fixture is mechanically attached. The fixture 200 may be mechanically attached to the metal shaft 50 of the hard roller 40 with hinges or clips. In another embodiment, clips may be used to attach the fixture to the mounts 70. In another embodiment, the fixture is attached via magnets to the plate 60. In yet another embodiment, the fixture is adhesively attached. As shown, the fixture 200 extends from the rolling platen 10 past the plate 60 to the cutting anvil 180. FIG. 14 illustrates the same structure as FIG. 13 but is shown from a different viewing angle. The fixture 200 is shown covering the face of the printer above the plate 60 at the cutting anvil 180 down to the rolling platen 10. In other embodiments, the size of the fixture may vary and be larger or smaller.

Figure 15:
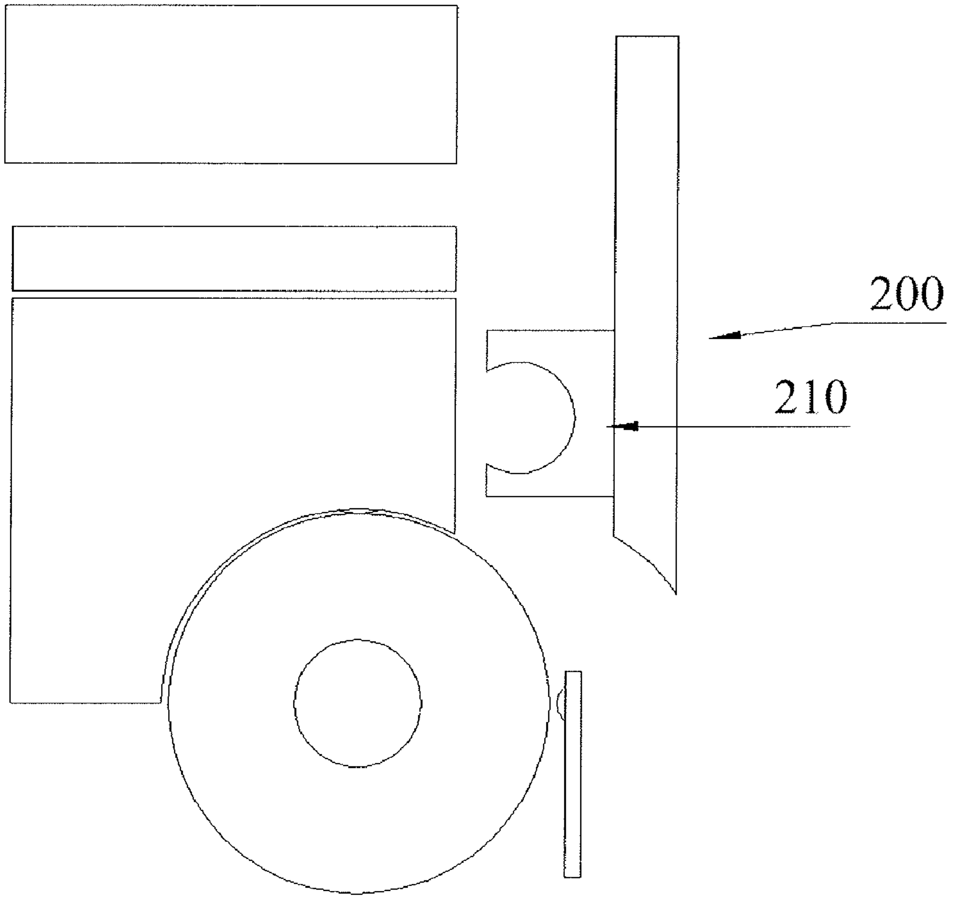
FIG. 15 is an illustration of components of a printer and a fixture with clips to show how the guide may be attached, according to an embodiment of the invention.
Figure 16:
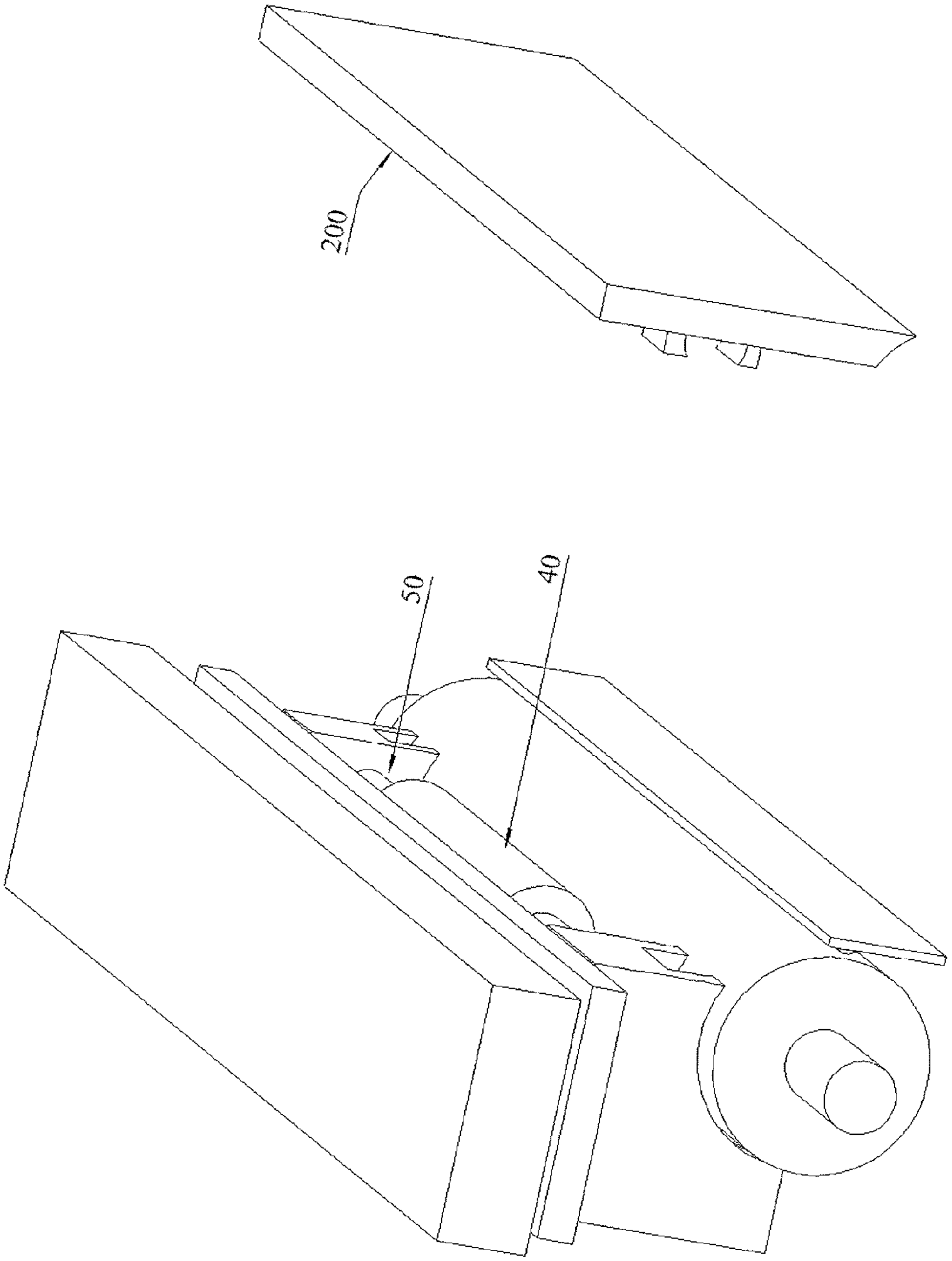
FIG. 16 is an illustration of components of a printer and a fixture with clips to show how the guide may be attached from a different angle, according to an embodiment of the invention.

FIG. 15 illustrates a side view of the printer with the fixture 200 unattached. The fixture 200 is shown with clips 210 and displays where the mechanical attachment with printer is to be made. FIG. 16 illustrates the same structure as FIG. 15 but is from a different view. This illustration better shows the key components of the printer including the metal shaft 50 of the hard roller 40 where the clips 210 of the fixture is attached.

Figure 17:
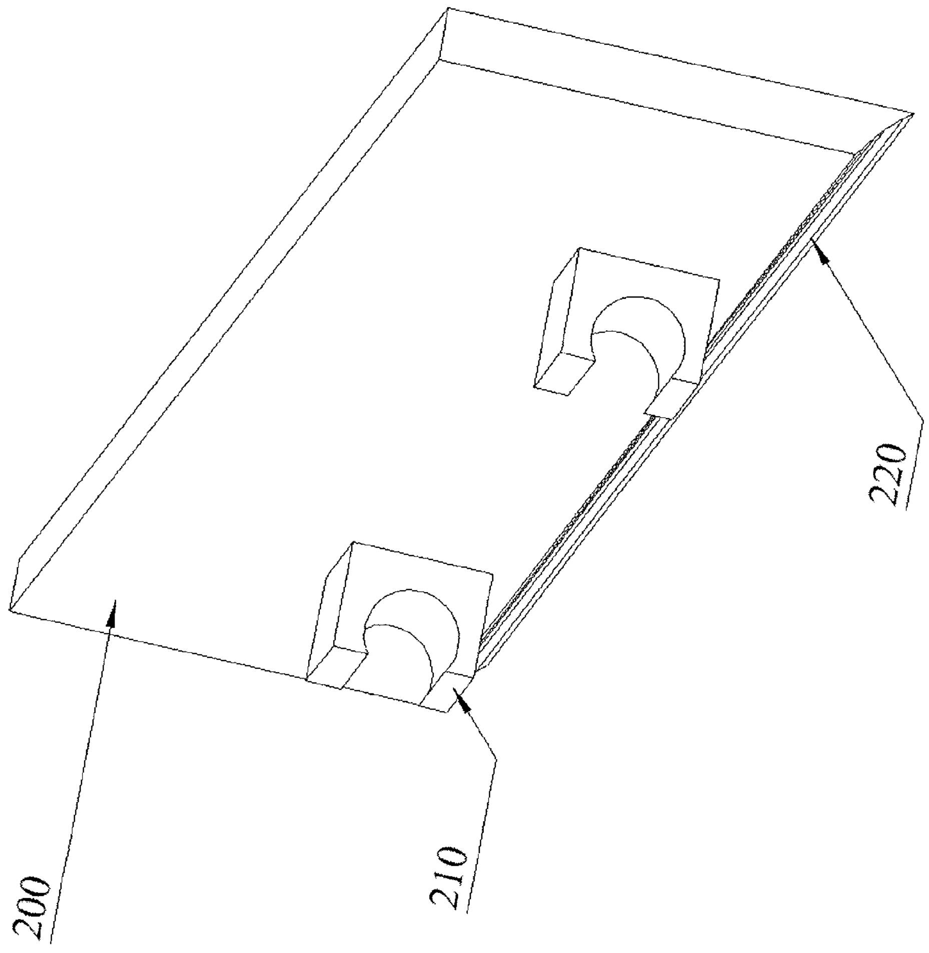
FIG. 17 is an illustration of a fixture with clips, according to an embodiment of the invention.

FIG. 17 is an illustration of the fixture 200 with clips 210. In an embodiment, the type of clip may vary based on what component of the POS printer that the fixture is attached (shaft of hard roller, mount, etc.). The bottom of the fixture is also rounded so that the rolling platen fits snugly with the structure. In an embodiment, the bottom edge 220 of the fixture may be given different shapes such as rounded or chiseled to better accommodate printer and linerless adhesive media used.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printer configured to print linerless adhesive media, the printer comprising:

a print head;

a rotating platen opposite the print head; and a release block that limits the linerless adhesive media from remaining attached to the rotating platen when the linerless adhesive media is fed past the rotating platen and print head, the release block reversibly attached to the printer to allow for printing of standard media;

wherein the release block is a guide label adhesively attached to mounts that hold a metal shaft of a hard roller located superior to the rotating platen.

2. The printer of claim 1, wherein the guide label comprises a substrate layer, an adhesive layer to attach the guide label to the printer, and a release layer.

3. The printer of claim 2, wherein the substrate layer comprises plastic.

4. The printer of claim 3, wherein the plastic is coated with PTFE.

5. The printer of claim 3, wherein the plastic is coated with polyester.

6. The printer of claim 2, wherein the substrate layer comprises paper.

7. The printer of claim 6, wherein the paper is coated with PTFE.

8. The printer of claim 6, wherein the paper is coated with polyester.

9. The printer of claim 2, wherein the substrate layer comprises a composite material.

10. The printer of claim 9, wherein the composite material comprises a combination of plastic and paper.

11. The printer of claim 9, wherein the composite material comprises combinations of different plastics.

12. The printer of claim 2, wherein the release layer comprises material that does not form strong bonds with the adhesive of the linerless adhesive media.

13. The printer of claim 2, wherein the release layer comprises silicone.

14. The printer of claim 2, wherein the release layer comprises flouropolymers.

15. The printer of claim 2, wherein the release layer comprises waxes.

16. The printer of claim 2, wherein the adhesive layer does not cover the entire back side of the guide label.

17. The printer of claim 2, further comprising a slip layer located opposite the substrate layer where the guide label meets the rotating platen.

18. The printer of claim 1, wherein a bottom edge of the guide label is chiseled.

19. The printer of claim 1, wherein a bottom edge of the guide label is rounded.

20. The printer of claim 1, wherein the release block is a fixture.

21. The printer of claim 20, wherein the fixture is attached using adhesive.

22. The printer of claim 20, wherein the fixture is attached to the printer via a mechanical attachment to the metal axle of the hard roller.

23. The printer of claim 20, wherein the fixture is attached to the printer using magnets.

24. The printer of claim 20, wherein the fixture comprises a single substrate, wherein release characteristics are intrinsic to the substrate.

25. A printer configured to print linerless adhesive media, the printer comprising:

a print head;

a rotating platen opposite the print head; and a release block that limits the linerless adhesive media from remaining attached to the rotating platen when the linerless adhesive media is fed past the rotating platen and print head, the release block reversibly attached to the printer to allow for printing of standard media;

wherein the release block is tape.

26. The printer of claim 25, wherein the tape is two sided tape with one side of the tape adhesively attached to the printer and the opposite side of the tape attached to a release liner.

* * * * *